US 011426710B2

United States Patent
Nishio et al.

(10) Patent No.: US 11,426,710 B2
(45) Date of Patent: Aug. 30, 2022

(54) EXHAUST GAS CONTROL CATALYST

(71) Applicants: TOYOTA JIDOSHA KABUSHIKI KAISHA, Toyota (JP); CATALER CORPORATION, Kakegawa (JP)

(72) Inventors: Takahiro Nishio, Toyota (JP); Shogo Shirakawa, Toyota (JP); Masahide Miura, Toyota (JP); Isao Chinzei, Toyota (JP); Seiji Nakahigashi, Toyota (JP); Norimichi Shimano, Toyota (JP); Hiromi Togashi, Kakegawa (JP); Hiroki Nihashi, Kakegawa (JP); Mitsuyoshi Okada, Kakegawa (JP); Takashi Onozuka, Kakegawa (JP); Souta Akiyama, Kakegawa (JP); Isao Naito, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 17/088,767

(22) Filed: Nov. 4, 2020

(65) Prior Publication Data
US 2021/0197175 A1 Jul. 1, 2021

(30) Foreign Application Priority Data
Dec. 26, 2019 (JP) .............................. JP2019-235860

(51) Int. Cl.
*B01J 23/00* (2006.01)
*B01J 23/46* (2006.01)
*B01J 23/44* (2006.01)
*B01J 23/42* (2006.01)
*B82Y 30/00* (2011.01)

(52) U.S. Cl.
CPC ............. *B01J 23/464* (2013.01); *B01J 23/42* (2013.01); *B01J 23/44* (2013.01); *B82Y 30/00* (2013.01)

(58) Field of Classification Search
CPC ......... B01J 23/464; B01J 23/42; B01J 23/44; B01J 23/63; B01J 35/0006; B01J 35/023; B82Y 30/00; F01N 3/28
USPC ...................................... 42/213.2; 423/213.2
See application file for complete search history.

(56) References Cited

FOREIGN PATENT DOCUMENTS

| JP | 2007-038085 A | | 2/2007 |
|---|---|---|---|
| JP | 2010234309 A | * | 10/2010 |
| JP | 2016-147256 A | | 8/2016 |
| WO | 2020/175142 A1 | | 9/2020 |

OTHER PUBLICATIONS

Machine translation of JP-2010234309-A (Year: 2010).*

* cited by examiner

*Primary Examiner* — Steven J Bos
(74) *Attorney, Agent, or Firm* — Oliff PLC

(57) ABSTRACT

The present disclosure relates to an exhaust gas control catalyst including a base and a catalyst coating layer having a two-layer structure on the base. The catalyst coating layer includes a lower layer on the base, and an upper layer on the lower layer. The upper layer of the catalyst coating layer contains Rh particles in which a mean particle diameter measured by observation using a transmission electron microscope is 1.0 nm or more and 2.0 nm or less and a particle-diameter standard deviation σ is 0.8 nm or less. A length of the upper layer from an end face on a downstream side in an exhaust gas flow direction falls within a range of 70% or more and 100% or less of a total length of the base.

3 Claims, 2 Drawing Sheets

EXHAUST GAS CONTROL CATALYST

INCORPORATION BY REFERENCE

The disclosure of Japanese Patent Application No. 2019-235860 filed on Dec. 26, 2019 including the specification, drawings and abstract is incorporated herein by reference in its entirety.

BACKGROUND

1. Technical Field

The present disclosure relates to an exhaust gas control catalyst.

2. Description of Related Art

Exhaust gas from an internal combustion engine of an automobile or the like contains harmful components such as carbon monoxide (CO), hydrocarbon (HC), and nitrogen oxide ($NO_x$). The exhaust gas is released into the atmosphere after the harmful components are removed by an exhaust gas control catalyst. Hitherto, a three-way catalyst that simultaneously performs oxidation of CO and HC and reduction of $NO_x$ is used as the exhaust gas control catalyst. A three-way catalyst using a noble metal such as platinum (Pt), palladium (Pd), or rhodium (Rh) as a catalyst metal is used widely.

In recent years, regulations on exhaust gas are becoming stricter, but there is a demand to reduce the amount of noble metals for use in exhaust gas control catalysts from the viewpoint of risk in resources. Among the noble metals, Rh serves for a $NO_x$ reduction activity. When Rh is more active, the reduction of the amount of noble metals can be expected while conforming to the regulations on exhaust gas.

As a method for reducing the amount of use of noble metals in exhaust gas control catalysts, there is known a method in which a noble metal is used by carrying fine particles of the noble metal on a carrier. For example, Japanese Unexamined Patent Application Publication No. 2016-147256 (JP 2016-147256 A) discloses a catalyst producing method including a step of carrying noble metal particles on an oxide carrier to obtain a noble-metal carrying catalyst, and a step of heating the noble-metal carrying catalyst in a reduction atmosphere to control the particle diameters of the noble metal within a predetermined range. Examples in JP 2016-147256 A demonstrate that the particle diameters of the noble metal particles on the oxide carrier were successfully controlled within a range of 2.8 nm or more and 3.8 nm or less.

Japanese Unexamined Patent Application Publication No. 2007-38085 (JP 2007-38085 A) discloses a catalyst producing method including a step of causing a reducing agent to act on a catalyst having noble metal particles carried on an oxide carrier to increase the sizes of the noble metal particles having small particle diameters, thereby controlling the minimum particle diameter of the noble metal particles within a range of 1 nm or more. Examples in JP 2007-38085 A demonstrate that the particle diameters of the noble metal particles on the oxide carrier were successfully controlled within a range of 3.0 nm or more and 4.1 nm or less.

In the related-art catalysts using Rh particles whose particle diameters are controlled, the Rh particles may aggregate during catalysis. Therefore, the Rh particles may deteriorate, and the durability of the catalyst may be insufficient. In the related-art exhaust gas control catalysts, a low-temperature activity may decrease depending on catalyst structures.

There is a demand to enhance the low-temperature activity of the related-art exhaust gas control catalysts using the Rh particles whose particle diameters are controlled as described above.

SUMMARY

The present disclosure provides an exhaust gas control catalyst that is more active at a low temperature.

The inventors have conducted various researches to address the problem described above, and found that the exhaust gas control catalyst is more active at a low temperature when Rh particles in which a mean particle diameter and a particle-diameter standard deviation σ are controlled within specific ranges are used for an upper layer of a catalyst coating layer. Accordingly, the present disclosure is attained.

(1) One aspect of the present disclosure relates to an exhaust gas control catalyst including a base and a catalyst coating layer having a two-layer structure on the base. The catalyst coating layer includes a lower layer on the base, and an upper layer on the lower layer. The upper layer of the catalyst coating layer contains Rh particles in which a mean particle diameter measured by observation using a transmission electron microscope is 1.0 nm or more and 2.0 nm or less and a particle-diameter standard deviation σ is 0.8 nm or less. A length of the upper layer from an end face on a downstream side in an exhaust gas flow direction falls within a range of 70% or more and 100% or less of a total length of the base.

(2) A length of the lower layer of the catalyst coating layer from an end face on an upstream side in the exhaust gas flow direction may fall within a range of 40% or more and 100% or less of the total length of the base.

(3) The lower layer of the catalyst coating layer may contain Pt as a catalyst metal.

According to the present disclosure, it is possible to provide the exhaust gas control catalyst that is more active at a low temperature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An exhaust gas control catalyst of the present disclosure includes a base and a catalyst coating layer on the base. The catalyst coating layer has a two-layer structure including a lower layer on the base, and an upper layer on the lower layer. In the exhaust gas control catalyst of the present disclosure, the upper layer of the catalyst coating layer contains rhodium (Rh) particles in which a mean particle diameter and a particle-diameter standard deviation σ are controlled within specific ranges (hereinafter referred to also as "diameter-controlled Rh particles" or "Rh particles").

In the exhaust gas control catalyst of the present disclosure, the length of the upper layer from an end face on a downstream side in an exhaust gas flow direction falls within a range of 70% or more and 100% or less of the total length of the base. Since the upper layer contains the diameter-controlled Rh particles and the length of the upper layer falls within this range, the durability of the catalyst is improved, and the catalyst is more active at a low temperature (for example, 250° C.). The lower layer is provided within a predetermined range from an end face on an upstream side in the exhaust gas flow direction. In each of the upper layer and the lower layer, the upper limit of a range of coating of the catalyst (hereinafter referred to also as "coating length") is a length corresponding to 100% of the total length of the base.

Figure 1:
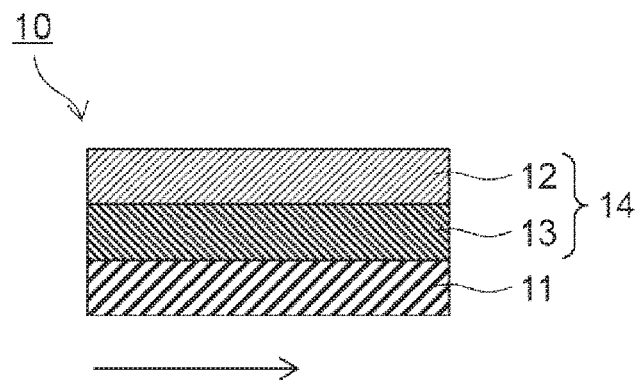
FIG. 1 is a schematic sectional view illustrating an exhaust gas control catalyst according to a first embodiment of the present disclosure.

FIG. 1 illustrates an exhaust gas control catalyst according to a first embodiment of the present disclosure. As illustrated in FIG. 1, an exhaust gas control catalyst 10 includes a base 11 and a catalyst coating layer 14 having a two-layer structure on the base 11. The catalyst coating layer 14 includes an upper layer 12 and a lower layer 13. In the first embodiment, the lengths of the upper layer 12 and the lower layer 13 are 100% of the total length of the base. In FIG. 1, an arrow indicates the exhaust gas flow direction. As a modification of the first embodiment, the length of the upper layer 12 from an end face on a downstream side in the exhaust gas flow direction may fall within a range of 70% or more and less than 100% of the total length of the base.

Figure 2:
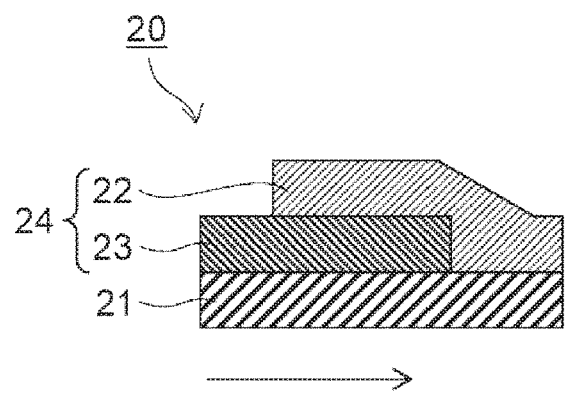
FIG. 2 is a schematic sectional view illustrating an exhaust gas control catalyst according to a second embodiment of the present disclosure.

FIG. 2 illustrates an exhaust gas control catalyst according to a second embodiment of the present disclosure. As illustrated in FIG. 2, a catalyst coating layer 24 of an exhaust gas control catalyst 20 includes an upper layer 22 and a lower layer 23. In the second embodiment, the length of the upper layer 22 from an end face on a downstream side in the exhaust gas flow direction falls within a range of 70% or more and less than 100% of the total length of the base. The length of the lower layer 23 from an end face on an upstream side in the exhaust gas flow direction falls within a range of less than 100% of the total length of the base. In FIG. 2, an arrow indicates the exhaust gas flow direction. As a modification of the second embodiment, the length of the upper layer 22 from the end face on the downstream side in the exhaust gas flow direction may be 100% of the total length of the base.

In the exhaust gas control catalyst of the present disclosure, the upper layer contains diameter-controlled Rh particles in any of the first and second embodiments and their modified embodiments. Thus, the durability of the catalyst is improved, and the catalyst is more active at a low temperature.

In the exhaust gas control catalyst of the present disclosure, the upper layer of the catalyst coating layer is provided within the range of 70% or more and 100% or less, or preferably 80% or more and 100% or less of the total length of the base from the downstream end face. In the present disclosure, the durability of the catalyst is improved and the catalyst is more active at a low temperature because the upper layer contains the diameter-controlled Rh particles. Those effects are remarkable when the coating length of the upper layer from the downstream end face is 70% or more of the total length of the base. The coating length of the upper layer of the catalyst coating layer from the downstream end face may fall within a range of 70% or more and 90% or less or 80% or more and 90% or less of the total length of the base.

It is appropriate that the length of the lower layer of the catalyst coating layer from the upstream end face fall within a range of 100% or less of the total length of the base. If Rh particles in which the mean particle diameter and the particle-diameter standard deviation σ fall out of the specific ranges of the present disclosure are used for the upper layer, the catalyst may be less active at a low temperature (for example, 250° C.) when the coating length of the lower layer increases. By using the diameter-controlled Rh particles of the present disclosure for the upper layer, the low-temperature activity of the catalyst can be kept at a high level even if the coating length of the lower layer increases. When the coating length of the lower layer of the catalyst coating layer increases, the catalyst tends to be more active at a high temperature (for example, 550° C.). Based on those factors, the coating length of the lower layer of the catalyst coating layer from the upstream end face falls within a range of preferably 40% or more and 100% or less, more preferably 60% or more and 100% or less, or particularly preferably 60% or more and 80% or less of the total length of the base. Since the coating length of the lower layer falls within the range of 40% or more and 100% or less of the total length of the base, both the low-temperature activity and the high-temperature activity of the catalyst can be achieved.

In a preferred embodiment, the coating length of the upper layer of the catalyst coating layer from the downstream end face falls within the range of 80% or more and 100% or less of the total length of the base, and the coating length of the lower layer of the catalyst coating layer from the upstream end face falls within the range of 40% or more and 100% or less of the total length of the base. In a more preferred embodiment, the coating length of the upper layer of the catalyst coating layer from the downstream end face falls within the range of 80% or more and 100% or less of the total length of the base, and the coating length of the lower layer of the catalyst coating layer from the upstream end face falls within the range of 60% or more and 80% or less of the total length of the base.

In the catalyst coating layer, the length of an overlap between the upper layer and the lower layer falls within a range of preferably 20% or more and 100% or less, preferably 20% or more and 60% or less, or more preferably 40% or more and 60% or less of the total length of the base.

The base for use in the exhaust gas control catalyst of the present disclosure is not particularly limited. A general material having a honeycomb shape with a large number of cells may be used for the base. Examples of the material for the base include ceramic materials having heat resistance, such as cordierite ($2MgO \cdot 2Al_2O_3 \cdot 5SiO_2$), alumina, zirconia, and silicon carbide, and metal materials in the form of metal foil, such as stainless steel. Cordierite is preferred from the viewpoint of costs.

The upper layer of the catalyst coating layer contains the Rh particles in which the mean particle diameter and the particle-diameter standard deviation σ are controlled within the specific ranges. The mean particle diameter of the diameter-controlled Rh particles is relatively small. Therefore, the diameter-controlled Rh particles have a significantly large specific surface area, and the catalyst is active at a high level. The diameter-controlled Rh particles achieve a high durability and a high catalytic activity because the particle diameter distribution is narrow and the proportions of coarse particles and fine particles are low. By using the diameter-controlled Rh particles for the upper layer of the catalyst coating layer, the durability of the catalyst is improved, and the catalyst is more active at a low temperature.

The mean particle diameter of the Rh particles is 1.0 nm or more and 2.0 nm or less. In the present disclosure, the mean particle diameter of the Rh particles is a mean number particle diameter obtained by directly measuring a diameter corresponding to that of a circle having a projected area based on an image captured by observation using a transmission electron microscope (TEM) and analyzing a group of 100 or more particles.

When the mean particle diameter of the Rh particles is 1.0 nm or more, the proportion of fine particles having a particle diameter of less than 1.0 nm can be reduced. The fine particles may aggregate into coarse particles during catalysis. Therefore, deterioration of the Rh particles can be suppressed, and the durability of the catalyst can be improved. When the mean particle diameter of the Rh particles is 2.0 nm or less, the surface area of the Rh particles can be increased, and the catalytic activity can be enhanced. The mean particle diameter of the Rh particles is preferably 1.1 nm or more, or more preferably 1.2 nm or more. Further, the mean particle diameter of the Rh particles is preferably 1.9 nm or less, more preferably 1.8 nm or less, or particularly preferably 1.6 nm or less. The mean particle diameter of the Rh particles is preferably 1.1 nm or more and 1.9 nm or less, or more preferably 1.2 nm or more and 1.8 nm or less.

The standard deviation σ of the particle diameters of the Rh particles measured by observation using the transmission electron microscope is 0.8 nm or less. Since the standard deviation σ of the particle diameters of the Rh particles is 0.8 nm or less, the particle diameter distribution is sharp, and the content proportions of fine particles and coarse particles are low. When the number of fine particles is small, aggregation of the Rh particles is suppressed during catalysis. Thus, deterioration of Rh is suppressed, and the durability of the catalyst is improved. When the number of coarse particles is small, the surface area of the Rh particles increases, and the catalytic activity is enhanced.

The standard deviation σ of the particle diameters of the Rh particles is preferably 0.7 nm or less, more preferably 0.6 nm or less, or particularly preferably 0.5 nm or less. The Rh particles may be monodispersed in terms of the particle diameter, but the effects of the present disclosure can be attained even when the standard deviation σ is 0.2 nm or more, 0.3 nm or more, or 0.4 nm or more.

In the Rh particles, the proportion of fine particles having a particle diameter of less than 1.0 nm is reduced in particular. Since the proportion of the fine particles having the particle diameter of less than 1.0 nm is reduced, aggregation of the Rh particles is suppressed during catalysis. Thus, deterioration of Rh is suppressed, and the durability of the catalyst is improved. The ratio of presence of the Rh particles having the particle diameter of less than 1.0 nm is preferably 5 wt % or less with respect to the total weight of the Rh particles. The value of the ratio may be 4 wt % or less, 3 wt % or less, 2 wt % or less, 1 wt % or less, 0.5 wt % or less, 0.3 wt % or less, or 0.1 wt % or less, or may also be 0 wt %.

In a preferred embodiment, the mean particle diameter of the Rh particles measured by using the transmission electron microscope is 1.2 nm or more and 1.8 nm or less, and the ratio of presence of the Rh particles having the particle diameter of less than 1.0 nm is 5.0 wt % or less with respect to the total weight of the Rh particles.

The Rh particles are preferably carried on carrier particles. The carrier particles are not particularly limited. For example, oxide carrier particles may be used. The Rh particles may be carried by a general carrying method such as an impregnation carrying method, an adsorption carrying method, or an absorption carrying method.

Examples of the oxide carrier particles include metal oxide particles. Examples of a metal contained in the metal oxide include one or more kinds out of metals selected from groups 3, 4, and 13 in the periodic table, and lanthanoid metals. When the oxide carrier particles are composed of oxides of two or more kinds of metal, the oxide carrier particles may be a mixture of two or more kinds of metal oxide, a composite oxide containing two or more kinds of metal, or a mixture of one or more kinds of metal oxide and one or more kinds of composite oxide.

Examples of the metal oxide include an oxide of one or more kinds of metal selected from among scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), and preferably an oxide of one or more kinds of metal selected from among Y, La, Ce, Ti, Zr, and Al. The metal oxide is preferably a composite oxide of yttria ($Y_2O_3$), lanthana ($La_2O_3$), and zirconia ($ZrO_2$).

The particle diameter of the carrier particles may be set as appropriate by a person skilled in the art depending on purposes.

When the Rh particles are used by being carried on the carrier particles, the carrying amount of the Rh particles is, for example, 5 wt % or less, 3 wt % or less, 1 wt % or less, 0.7 wt % or less, 0.5 wt % or less, 0.3 wt % or less, or 0.2 wt % or less with respect to the weight of the carrier particles. Further, the carrying amount of the Rh particles is, for example, 0.01 wt % or more, 0.02 wt % or more, 0.05 wt % or more, 0.07 wt % or more, 0.1 wt % or more, 0.2 wt % or more, 0.5 wt % or more, or 1 wt % or more with respect to the weight of the carrier particles.

When the Rh particles are used by being carried on the carrier particles, the Rh-carrying catalyst particles can be produced by bringing the carrier particles into contact with an Rh-particle precursor dispersion and then baking the resultant. The Rh-particle precursor dispersion contains Rh-particle precursors controlled to have a predetermined particle diameter distribution.

For example, the Rh-particle precursor dispersion can be produced by any one of the following methods. (1) An acidic solution of an Rh compound reacts with a basic solution in a reactor in which a clearance in a reaction field is set within a predetermined range (Method 1). (2) An acidic solution of an Rh compound is mixed with a basic solution to cause reaction, and then the resultant is stirred in a high-speed mixer (Method 2).

In Method 1, the reactor in which the clearance in the reaction field is set within the predetermined range is used during the reaction between the acidic solution of the Rh compound (for example, an inorganic acid salt of Rh) and the basic solution (for example, an aqueous solution of an organic compound containing nitrogen). Thus, the particle diameter and the particle diameter distribution of the Rh-particle precursors (for example, a hydroxide of Rh) contained in the obtained dispersion can be controlled.

Examples of a clearance adjustment member of the reactor include two flat plates, a combination of a flat plate and a corrugated plate, and a capillary tube. The clearance in the reaction field may be set as appropriate depending on a desired particle diameter and a desired particle diameter distribution. Examples of the reactor in which the clearance in the reaction field is set within the predetermined range include a microreactor having an appropriate clearance adjustment member.

In Method 2, the acidic solution of the Rh compound (for example, an inorganic acid salt of Rh) reacts with the basic solution (for example, an aqueous solution of an organic compound containing nitrogen) to produce particles having a large particle diameter as the Rh-particle precursors. The Rh-particle precursors are stirred in the high-speed mixer and dispersed by applying a great shear force. Thus, the mean particle diameter and the particle diameter distribution of the dispersed Rh-particle precursors can be controlled.

The Rh-particle precursor dispersion prepared as described above is brought into contact with the carrier particles and then the resultant is baked. Thus, the Rh-carrying catalyst particles can be obtained.

The content of the Rh particles in the upper layer of the catalyst coating layer is preferably 0.01 g/L or more and 0.7 g/L or less, or more preferably 0.1 g/L or more and 0.5 g/L or less with respect to the volume of the base. When the content of the Rh particles in the upper layer is 0.01 g/L or more and 0.7 g/L or less, the durability of the catalyst can be improved, and the amount of Rh use can be reduced.

When the Rh-carrying catalyst particles are used by carrying the Rh particles on the carrier particles, the content of the Rh-carrying catalyst particles in the upper layer of the catalyst coating layer is preferably 10 g/L or more and 80 g/L or less, or more preferably 20 g/L or more and 60 g/L or less with respect to the volume of the base.

The upper layer of the catalyst coating layer preferably contains an oxygen storage capacity (OSC) material. The OSC material is an inorganic material having an oxygen storage capacity. When lean exhaust gas is supplied, the OSC material stores oxygen. When rich exhaust gas is supplied, the OSC material releases the stored oxygen. The OSC material is not particularly limited. Examples of the OSC material include cerium oxide (ceria: $CeO_2$), and a composite oxide containing ceria (for example, a ceria-zirconia ($ZrO_2$) composite oxide (CZ or ZC composite oxide)). Among the OSC materials, the ceria-zirconia composite oxide is preferred because of a high oxygen storage capacity and a relatively low cost. The ceria-zirconia composite oxide may be used in the form of a composite oxide with lanthana ($La_2O_3$) and yttria ($Y_2O_3$). The mixing ratio of ceria and zirconia in the ceria-zirconia composite oxide ($CeO_2/ZrO_2$) is preferably 0.1 or more and 1.0 or less.

When the upper layer of the catalyst coating layer contains the OSC material, the content of the OSC material is preferably 1 g/L or more and 75 g/L or less, or more preferably 5 g/L or more and 50 g/L or less with respect to the volume of the base. When the content of the OSC material in the upper layer is 1 g/L or more and 75 g/L or less with respect to the volume of the base, the durability of the catalyst can be improved effectively.

The upper layer of the catalyst coating layer may contain any appropriate component other than the diameter-controlled Rh particles and the OSC material. The other component is not particularly limited, and may be, for example, a metal oxide. When the upper layer of the catalyst coating layer contains another component, the content of the other component is preferably 100 g/L or less, or more preferably 50 g/L or less with respect to the volume of the base.

The metal oxide is not particularly limited. Examples of the metal oxide include an oxide of one or more kinds of metal selected from among scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). The metal oxide is preferably alumina ($Al_2O_3$) or a composite oxide of $Al_2O_3$ and lanthana ($La_2O_3$).

The lower layer of the catalyst coating layer preferably contains a platinum-group noble metal other than Rh as a catalyst metal. Examples of the platinum-group noble metal include ruthenium (Ru), palladium (Pd), osmium (Os), iridium (Ir), and platinum (Pt), and Pt is preferred. When the diameter-controlled Rh particles are used in the upper layer of the catalyst coating layer, the durability of the catalyst can be improved under coexistence with the catalyst metal such as the platinum-group noble metal in the lower layer.

In the lower layer of the catalyst coating layer, the catalyst metal may be used by being carried on carrier particles. The carrier particles are not particularly limited. For example, oxide carrier particles may be used. The catalyst metal may be carried by a general carrying method such as an impregnation carrying method, an adsorption carrying method, or an absorption carrying method.

Examples of the oxide carrier particles include metal oxide particles. Examples of a metal contained in the metal oxide include one or more kinds out of metals selected from groups 3, 4, and 13 in the periodic table, and lanthanoid metals. When the oxide carrier particles are composed of oxides of two or more kinds of metal, the oxide carrier particles may be a mixture of two or more kinds of metal oxide, a composite oxide containing two or more kinds of metal, or a mixture of one or more kinds of metal oxide and one or more kinds of composite oxide.

Examples of the metal oxide include an oxide of one or more kinds of metal selected from among scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), and preferably an oxide of one or more kinds of metal selected from among Y, La, Ce, Ti, Zr, and Al. The metal oxide is preferably alumina ($Al_2O_3$) or a composite oxide of $Al_2O_3$ and lanthana ($La_2O_3$).

The content of the catalyst metal in the lower layer of the catalyst coating layer is preferably 0.01 g/L or more and 1 g/L or less, or more preferably 0.1 g/L or more and 0.9 g/L or less with respect to the volume of the base. When the content of the catalyst metal in the lower layer is 0.01 g/L or more and 1 g/L or less, a sufficiently high exhaust gas control capacity is secured.

When carrying catalyst particles are used by carrying the catalyst metal on the carrier particles, the content of the carrying catalyst particles in the lower layer is preferably 1 g/L or more and 100 g/L or less, or more preferably 10 g/L or more and 50 g/L or less with respect to the volume of the base.

The lower layer of the catalyst coating layer may contain any appropriate component other than the catalyst metal. The other component is not particularly limited, and may be, for example, an OSC material. When the lower layer of the catalyst coating layer contains another component, the content of the other component is preferably 100 g/L or less, more preferably 80 g/L or less, or particularly preferably 60 g/L or less with respect to the volume of the base.

The OSC material is not particularly limited. Examples of the OSC material include cerium oxide (ceria: $CeO_2$), and a composite oxide containing ceria (for example, a ceria-zirconia ($ZrO_2$) composite oxide (CZ or ZC composite oxide)). Among the OSC materials, the ceria-zirconia composite oxide is preferred because of a high oxygen storage capacity and a relatively low cost. The ceria-zirconia composite oxide may be used in the form of a composite oxide with lanthana ($La_{23}$) and yttria ($Y_2O_3$). The mixing ratio of ceria and zirconia in the ceria-zirconia composite oxide ($CeO_2/ZrO_2$) is preferably 0.1 or more and 1.0 or less.

The exhaust gas control catalyst of the present disclosure can be produced by coating the base with slurries containing the components of the catalyst coating layer by methods known to persons skilled in the art. In one embodiment, the base is coated with a slurry containing the catalyst metal such as Pt and the OSC material over a predetermined range from the upstream end face of the base by a known method, and the coated base is dried and baked at a predetermined temperature for a predetermined time. Thus, the lower layer is formed on the base. Subsequently, the base having the lower layer is coated with a slurry containing the diameter-controlled Rh particles, the OSC material, and the metal oxide over a predetermined range from the downstream end face by a known method, and the coated base is dried and baked at a predetermined temperature for a predetermined time. Thus, the upper layer is formed.

The present disclosure is described below in more detail by way of examples. The technical scope of the present disclosure is not limited to the examples.

<Preparation of Catalyst>

Materials in Use

Material 1: $Al_2O_3$: $Al_2O_3$ combined with 4 wt % of $La_2O_3$

Material 2: ZY: Composite oxide of 84 wt % of $ZrO_2$, 6 wt % of $La_2O_3$, and 10 wt % of $Y_2O_3$ Material 3: Pt/$Al_2O_3$: Material composed of Material 1 and Pt carried on Material 1

Material 4: Diameter-controlled Rh dispersion

Material 5: Rh/ZY: Material composed of Material 2 and Rh carried on Material 2

Material 6: Diameter-controlled Rh/ZY: Material composed of Material 2 Rh of Material 4 carried on Material 2

Material 7: Beaker-method Rh dispersion

Material 8: Beaker-method Rh/ZY: Material composed of Material 2 and Rh of Material 7 carried on Material 2

Material 9: ZC (OSC material): Composite oxide of 20 wt % of $CeO_2$, 70 wt % of $ZrO_2$, 5 wt % of $La_2O_3$, and 5 wt % of $Y_2O_3$ Base: Cordierite honeycomb base of 875 cc (400 square cells with wall thickness of 4 mils)

Material 3 to Material 8 were prepared as follows.

Material 3: Pt/$Al_2O_3$

A platinum nitrate solution and Material 1 were brought into contact with each other, and then the resultant was baked to obtain Material 3 composed of Material 1 and Pt that is carried on Material 1 such that the carrying amount of Pt is 2.85 wt % with respect to the weight of Material 1.

Material 4: Diameter-Controlled Rh Dispersion

Rhodium(III) nitrate was added at 0.2 g and dissolved in ion-exchanged water of 50 mL to prepare an acidic solution of an Rh compound (pH: 1.0).

An aqueous solution of tetraethylammonium hydroxide (concentration: 175 g/L, pH: 14) was prepared as an organic base solution.

A reactor (microreactor) having two flat plates as a clearance adjustment member was used, and the acidic solution of the Rh compound and the organic base solution were introduced into a reaction field in which the clearance was set to 10 μm. With this method, a reaction was caused between the solutions under a condition that a molar ratio (TEAH/RN) of tetraethylammonium hydroxide (TEAH) and rhodium nitrate (RN) was 18. Thus, an Rh-particle precursor dispersion was prepared. The pH of the obtained Rh-particle precursor dispersion was 14. A median diameter (D50) of Rh-particle precursors contained in the obtained Rh-particle precursor dispersion was measured by dynamic light scattering (DLS). The measurement result was 2.0 nm.

Material 5: Rh/ZY

A rhodium nitrate solution and Material 2 were brought into contact with each other, and then the resultant was baked to obtain a material composed of Material 2 and Rh that is carried on Material 2 such that the carrying amount of Rh is 0.75 wt % with respect to the weight of Material 2. The mean particle diameter of Rh particles was measured by using a transmission electron microscope. The measurement result was 0.70 nm.

Material 6: Diameter-Controlled Rh/ZY

Material 4 and Material 2 were brought into contact with each other, and then the resultant was baked to obtain Material 6 composed of Material 2 and Rh that is carried on Material 2 such that the carrying amount of Rh is 0.75 wt % with respect to the weight of Material 2. The mean particle diameter of Rh particles was measured by using the transmission electron microscope. The measurement result was 1.40 nm. The particle-diameter standard deviation σ was 0.48 nm. In the particle diameter distribution of the diameter-controlled Rh, the proportion of fine particles of less than 1.0 nm was lower than that in the beaker-method Rh of Material 8.

Material 7: Beaker-Method Rh Dispersion

Material 7 was prepared similarly to the preparation of Material 4 except that the reaction between the acidic solution of the Rh compound and the organic base solution was caused in a beaker without using the reactor having the clearance adjustment member.

Material 8: Beaker-Method Rh/ZY

Material 8 composed of Material 2 and Rh of Material 7 carried on Material 2 was prepared similarly to the preparation of Material 6. The mean particle diameter of Rh particles was measured by using the transmission electron microscope. The measurement result was 1.42 nm. The particle-diameter standard deviation σ was 0.94 nm.

Example 1

Material 3, Material 9, and an $Al_2O_3$-based binder were added into distilled water while being stirred to prepare Slurry 1 in which the materials were suspended. Next, prepared Slurry 1 was poured onto the base from the upstream end face, and an unnecessary portion was blown off by a blower. Thus, the wall of the base was coated with the materials. The coating length from the upstream end face was adjusted to 40% of the total length of the base. The coating amount was adjusted to 30 g/L for Material 3 and 40 g/L for Material 9 with respect to the volume of the base. Lastly, the coated base was dried at 120° C. for two hours by using a dryer, and then baked at 500° C. for two hours in an electric furnace. Thus, a lower layer of a catalyst coating layer was prepared.

Similarly, Material 6, Material 1, Material 9, and an $Al_2O_3$-based binder were added into distilled water while being stirred to prepare Slurry 2 in which the materials were suspended. Next, prepared Slurry 2 was poured onto the base from the downstream end face, and an unnecessary portion was blown off by the blower. Thus, the wall of the base was coated with the materials. The coating length from the downstream end face was adjusted to 80% of the total length of the base. The coating amount was adjusted to 50 g/L for Material 6, 25 g/L for Material 1, and 15 g/L for Material 9 with respect to the volume of the base. Lastly, the coated base was dried at 120° C. for two hours by using the dryer, and then baked at 500° C. for two hours in the electric furnace. Thus, an upper layer of the catalyst coating layer was prepared.

Examples 2 and 3

Catalysts of Examples 2 and 3 were prepared similarly to Example 1 except that the coating length of the lower layer was changed to 60% and 80% of the total length of the base, respectively.

Comparative Example 1

A catalyst of Comparative Example 1 was prepared similarly to Example 1 except that Material 6 was replaced with Material 5.

Comparative Examples 2 and 3

Catalysts of Comparative Examples 2 and 3 were prepared similarly to Comparative Example 1 except that the coating length of the lower layer was changed to 60% and 80% of the total length of the base, respectively.

Comparative Example 4

A catalyst of Comparative Example 4 was prepared similarly to Example 3 except that Material 6 was replaced with Material 8.

Comparative Example 5

A catalyst of Comparative Example 5 was prepared similarly to Example 3 except that the coating length of the upper layer was changed to 60% of the total length of the base.

Table 1 shows compositions and coating lengths of the upper layers and the lower layers of the catalysts of Examples 1 to 3 and Comparative Examples 1 to 5.

TABLE 1

|  | Lower layer | | | Upper layer | | |
| --- | --- | --- | --- | --- | --- | --- |
|  | Material in use | Material composition | Coating length (%) | Material in use | Material composition | Coating length (%) |
| Example 1 | Material 3 | Pt/Al$_2$O$_3$ | 50 | Material 1 | Al$_2$O=dh 3 | 80 |
|  | Material 9 | ZC |  | Material 9 | ZC |  |
|  |  |  |  | Material 6 | Diameter-controlled Rh/Zy |  |
| Example 2 | Material 3 | Pt/Al$_2$O$_3$ | 60 | Material 1 | Al$_2$O$_3$ | 80 |
|  | Material 9 | ZC |  | Material 9 | ZC |  |
|  |  |  |  | Material 6 | Diameter-controleed Rh/ZY |  |
| Example 3 | Material 3 | Pt/Al$_2$O$_3$ | 80 | Material 1 | Al$_2$O$_3$ | 80 |
|  | Material 9 | ZC |  | Material 9 | ZC |  |
|  |  |  |  | Material 6 | Diameter-controlled Rh/ZY |  |
| Comparative Example 1 | Material 3 | Pt/Al$_2$O$_3$ | 80 | Material 1 | Al$_2$O$_3$ | 80 |
|  | Material 9 | ZC |  | Material 9 | ZC |  |
|  |  |  |  | Material 5 | Rh/ZY |  |
| Comparative Example 2 | Material 3 | Pt/Al$_2$O$_3$ | 60 | Material 1 | Al$_2$O$_3$ | 80 |
|  | Material 9 | ZC |  | Material 9 | ZC |  |
|  |  |  |  | Material 5 | Rh/ZY |  |
| Comparative Example 3 | Material 3 | Pt/Al$_2$O$_3$ | 80 | Material 1 | Al$_2$O$_3$ | 80 |
|  | Material 9 | ZC |  | Material 9 | ZC |  |
|  |  |  |  | Material 5 | Rh/ZY |  |
| Comparative Example 4 | Material 3 | Pt/Al$_2$O$_3$ | 80 | Material 1 | Al$_2$O$_3$ | 80 |
|  | Material 9 | ZC |  | Material 9 | ZC |  |
|  |  |  |  | Material 8 | Beaker-method Rh/ZY |  |
| Comparative Example 5 | Material 3 | Pt/Al$_2$O$_3$ | 80 | Material 1 | Al$_2$O$_3$ | 80 |
|  | Material 9 | ZC |  | Material 9 | ZC |  |
|  |  |  |  | Material 6 | Diameter-controlled Rh/ZY |  |

<Durability Test>

Durability tests were conducted for the prepared catalysts by using an actual engine. Specifically, the durability tests were conducted such that each catalyst was mounted on an exhaust system of a V-type eight-cylinder engine and exhaust gas in a stoichiometric atmosphere and exhaust gas in a lean atmosphere flowed repeatedly in each fixed time (ratio of 3:1) at a catalyst bed temperature of 900° C. for 46 hours.

<Performance Evaluation>

Low-Temperature Activity Evaluation

Exhaust gas having an air-fuel ratio (A/F) of 14.1 and exhaust gas having an A/F of 15.1 were alternately supplied for three minutes at a catalyst bed temperature of 250° C., and a $NO_x$ removal rate at an exhaust gas mass flow rate (Ga) of 20 g/s was evaluated. The A/Fs were switched at a timing of about 1.2 to 1.6 seconds, which was determined based on a sensor determination value. The $NO_x$ removal rate was calculated by averaging $NO_x$ removal rates measured for 60 seconds after two minutes elapsed in the rich exhaust gas (A/F=14.1) for the third time of switching.

High-Temperature Activity Evaluation

Exhaust gas having an air-fuel ratio (A/F) of 14.1 and exhaust gas having an A/F of 15.1 were alternately supplied for three minutes at a catalyst bed temperature of 550° C., and a $NO_x$ removal rate at a Ga of 35 g/s was evaluated. The A/Fs were switched at a timing of about 1.2 to 1.6 seconds, which was determined based on a sensor determination value. The $NO_x$ removal rate was calculated by averaging $NO_x$ removal rates measured for 60 seconds after two minutes elapsed in the rich exhaust gas (A/F=14.1) for the third time of switching.

Figure 3:
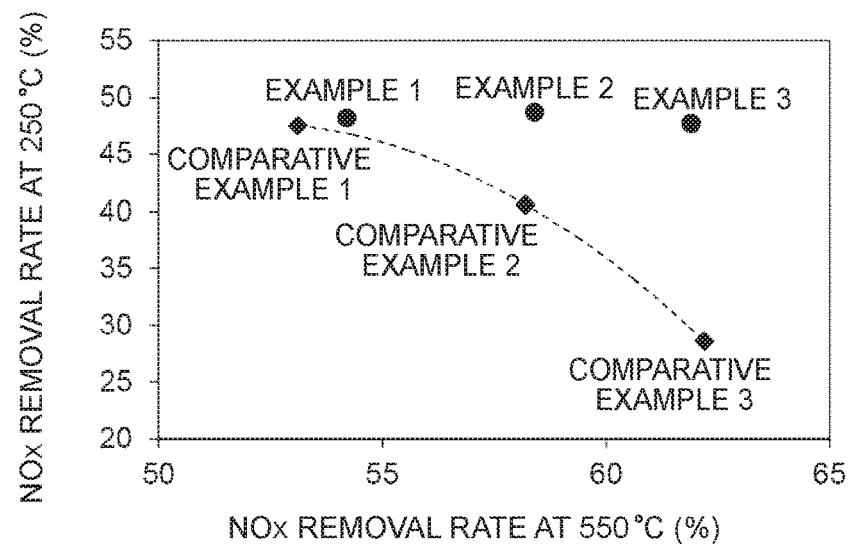
FIG. 3 is a graph illustrating $NO_x$ removal rates of catalysts of Examples 1 to 3 and Comparative Examples 1 to 3 at a low temperature (250° C.) and a high temperature (550° C.)

Table 2 shows the coating lengths of the upper layers and the lower layers and details of the Rh particles in the catalysts of Examples 1 to 3 and Comparative Examples 1 to 5. FIG. 3 illustrates $NO_x$ removal rates of the catalysts of Examples 1 to 3 and Comparative Examples 1 to 3 at the low temperature (250° C.) and the high temperature (550° C.).

TABLE 2

| | Lower layer coating length (%) | Upper layer coating length (%) | Rh particles | Mean particle diameter of Rh particles (nm) | Standard deviation σ of Rh particles (nm) |
|---|---|---|---|---|---|
| Example 1 | 40 | 80 | Material 6 | 1.40 | 0.48 |
| Example 2 | 60 | | | | |
| Example 3 | 80 | | | | |
| Comparative Example 1 | 40 | | Material 5 | 0.70 | — |
| Comparative Example 2 | 60 | | | | |
| Comparative Example 3 | 80 | | | | |
| Comparative Example 4 | 80 | 80 | Material 8 | 1.42 | 0.94 |
| Comparative Example 5 | 80 | 60 | Material 6 | 1.40 | 0.48 |

As illustrated in FIG. 3, in the catalysts of Examples 1 to 3 each including the upper layer containing the diameter-controlled Rh particles in which the mean particle diameter and the particle-diameter standard deviation σ were controlled within the specific ranges of the present disclosure, the $NO_x$ removal rate at the low temperature was significantly high in comparison with the catalysts of Comparative Examples 1 to 3 in which the mean particle diameter of the Rh particles fell out of the predetermined range of the present disclosure. In particular, at the same coating length of the lower layer, the $NO_x$ removal rate at the high temperature was substantially equal but the $NO_x$ removal rate at the low temperature was significantly high in the catalysts of Examples 1 to 3 in comparison with the catalysts of Comparative Examples 1 to 3. In the catalysts of Comparative Examples 1 to 3, the $NO_x$ removal rate at the low temperature tended to decrease as the coating length of the lower layer increased. In the catalysts of Examples 1 to 3 using the diameter-controlled Rh particles, the $NO_x$ removal rate at the low temperature was substantially constant even though the coating length of the lower layer increased. Thus, in the catalyst of the present disclosure using the diameter-controlled Rh particles, the enhancement effect for the low-temperature activity increased as the coating length of the lower layer increased.

Figure 4:
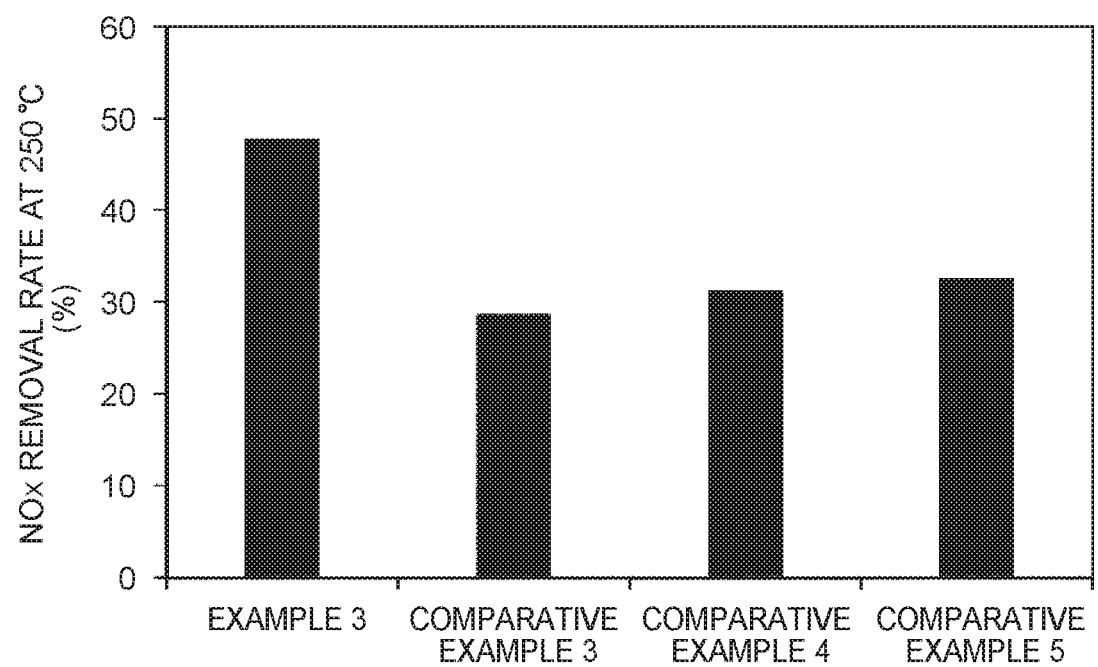
FIG. 4 is a graph illustrating $NO_x$ removal rates of catalysts of Example 3 and Comparative Examples 3 to 5 at a low temperature (250° C.).

FIG. 4 illustrates $NO_x$ removal rates of the catalysts of Example 3 and Comparative Examples 3 to 5 at the low temperature (250° C.). The catalysts of Example 3 and Comparative Examples 3 and 4 differ from each other in terms of the type of the Rh particles used in the upper layer. The catalysts of Example 3 and Comparative Example 5 differ from each other in terms of the coating length of the upper layer of the catalyst coating layer. As illustrated in FIG. 4, the comparison between Example 3 and Comparative Examples 3 and 4 demonstrates that the $NO_x$ removal rate at the low temperature is significantly high when the mean particle diameter of the Rh particles contained in the upper layer and the particle-diameter standard deviation σ are controlled within the specific ranges of the present disclosure. In particular, the comparison between Example 3 and Comparative Example 4 demonstrates that the $NO_x$ removal rate at the low temperature is improved by controlling the particle-diameter standard deviation σ as well as the mean particle diameter of the Rh particles. This is possibly because the standard deviation σ of the particle diameters of the Rh particles is small and the particle diameters are more uniform. The comparison between Example 3 and Comparative Example 5 demonstrates that the coating length of the upper layer using the diameter-controlled Rh particles has a range appropriate to improve the $NO_x$ removal rate at the low temperature and the range is 70% or more and 100% or less of the total length of the base.

What is claimed is:

1. An exhaust gas control catalyst comprising a base and a catalyst coating layer having a two-layer structure on the base, wherein
    the catalyst coating layer includes a lower layer on the base, and an upper layer on the lower layer,
    the upper layer of the catalyst coating layer contains Rh particles in which a mean particle diameter measured by observation using a transmission electron microscope is 1.0 nm or more and 2.0 nm or less and a particle-diameter standard deviation σ is 0.8 nm or less, and
    a length of the upper layer from an end face on a downstream side in an exhaust gas flow direction falls within a range of 70% or more and 100% or less of a total length of the base.

2. The exhaust gas control catalyst according to claim 1, wherein a length of the lower layer of the catalyst coating layer from an end face on an upstream side in the exhaust gas flow direction falls within a range of 40% or more and 100% or less of the total length of the base.

3. The exhaust gas control catalyst according to claim 1, wherein the lower layer of the catalyst coating layer contains Pt as a catalyst metal.

\* \* \* \* \*